(12) United States Patent
Guo

(10) Patent No.: US 6,782,130 B2
(45) Date of Patent: *Aug. 24, 2004

(54) RENDERING OF PHOTOREALISTIC COMPUTER GRAPHICS IMAGES

(75) Inventor: Baining Guo, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/410,730

(22) Filed: Apr. 10, 2003

(65) Prior Publication Data

US 2003/0169275 A1 Sep. 11, 2003

Related U.S. Application Data

(63) Continuation of application No. 09/303,966, filed on May 3, 1999.

(51) Int. Cl.⁷ .................................................. G06K 9/48
(52) U.S. Cl. ......................... 382/199; 345/419; 345/606; 345/611; 382/240; 382/258; 382/260; 382/300
(58) Field of Search ............... 345/419, 420–427, 345/606, 611; 382/100, 240, 174, 199, 236, 258, 260–261, 266–269, 300

(56) References Cited

U.S. PATENT DOCUMENTS

| | | |
|---|---|---|
| 5,031,117 A | 7/1991 | Minor et al. |
| 5,283,859 A | 2/1994 | Quarendon et al. |
| 5,542,032 A | 7/1996 | Pritt |
| 5,583,975 A | 12/1996 | Naka et al. |
| 5,831,623 A | 11/1998 | Negishi et al. |
| 5,872,902 A | 2/1999 | Kuchkuda et al. |
| 5,987,172 A | 11/1999 | Michael |
| 6,040,911 A | 3/2000 | Nozaki et al. |
| 6,101,277 A | 8/2000 | Go |
| 6,148,115 A | 11/2000 | Mackinnon et al. |
| 6,167,154 A | 12/2000 | Renaud et al. |
| 6,181,802 B1 | 1/2001 | Todd |
| 6,370,279 B1 | 4/2002 | Paik |

OTHER PUBLICATIONS

C. Kolb. Rayshade User's Guide and Reference Manual. Rayshade home page at graphics.Stanford.edu, Jan. 1992.

J. Arvo. The Irradiance Jacobian for Partially Occluded Polyhedral Sources. In A. Glassner, editor, *Computer Graphics Proceedings*, Annual Conference Series, pp. 75–84, Jul. 1994.

L.D. Bergman et al., Image Rendering by Adaptive Refinement. In D.C. Evans and R.J. Athay, editors, *Computer Graphics (SIGGRAPH '86 Proceedings)*, vol. 20, pp. 29–37, Aug. 1986.

J. Bloomenthal, Edge Inference with Applications to Antaliasing. In *Computer Graphics (SIGGRAPH '83 Proceedings)*, vol. 17, pp. 157–162, Jul. 1983.

M.R. Bolin et al., A Frequency Based Ray Tracer. In R. Cook, editor, *Computer Graphics Proceedings*, Annual Conference Series, pp. 409–418, Aug. 1995.

(List continued on next page.)

Primary Examiner—Bhavesh M. Mehta
Assistant Examiner—Gregory Desire
(74) Attorney, Agent, or Firm—Blakely, Sokoloff, Taylor & Zafman LLP

(57) ABSTRACT

A method, apparatus, and system are provided for rendering of photorealistic computer graphics images. According to one embodiment, an image is partitioned into regions, each of the regions having a discontinuity edge, a boundary, edge pixels along the boundary, and remaining pixels, and orientation of the discontinuity edge is estimated by computing a direction of least discrepancy within each of the regions by evaluating the edge pixels along the boundary of each of the regions.

21 Claims, 4 Drawing Sheets

OTHER PUBLICATIONS

A.T. Campbell III et al., Adaptive Mesh Generation for Global Diffuse Illumination. In Computer Graphics (SIGGRAPH '90 Proceedings), vol. 24, pp. 155–164, Aug. 1990.

S.E. Chen et al., A Progressive Multi–Pass Method for Global Illumination. In T.W. Sederberg, editor. *Computer Graphics (SIGGRAPH '91 Proceedings)* vol. 25, pp. 165–174, Jul. 1991.

N. Chin an S. Feiner. Near Real–Time Shadow Generation Using BSP Trees. In J. Lane, editor, *Computer Graphics (SIGGRAPH '89 Proceedings)* vol. 23, pp. 99–106, Jul. 1989.

M.F. Cohen et al., A Progressive Refinement Approach to Fast Radiosity Image Generation. In J. Dill, editor, *Computer Graphics (SIGGRAPH '88 Proceedings)*, vol. 22, pp. 75–84, Aug. 1988.

R.L. Cook et al., Distributed Ray Tracing. In *Computer Graphics (SIGGRAPH '84 Proceedings)*, vol. 18, pp. 137–145, Jul. 1984.

F. Crow. Shadow Algorithms for Computer Grapics. In *Computer Graphics (SIGGRAPH '77 Proceedings)*, vol. 11, pp. 242–248, Jul. 1977.

G. Dretakkis and E. Fiume. A Fast Shadow Algorithm for Area Light Sources Using Backprojection. In A. Glassner, editor, *Computer Graphics Proceedings, Annual Conference Series*, pp. 223–230, Jul. 1994.

A. Fujimoto et al., ARTS: Accelerated Ray Tracing System. IEEE *Computer Graphics and Applications*, 6(4): Jul. 16–26, Jul. 1986.

R. Heckbert. Discontinuity Meshing for Radiosity. *Third Eurographics Workshop on Rendering*, pp. 203–226, May 1992.

A. Jain. *Fundamentals of Digital Image Processing*. Prentice Ha.., 1989.

J. Kajiya. The Rendering Equation. In *Computer Graphics (SIGGRAPH '86 Proceedings)*, vol. 20, pp. 143–150, Aug. 1986.

M. Kunt et al., Second–Generation Image Coding Techniques. *Proc. Of IEEE*, 73(4):549–574, 1985.

M.E. Lee et al. Statistically Optimized Sampling for Distributed Ray Tracing. In B.A. Barsky, editor *Computer Graphics (SIGGRAPH '85 Proceedings)*, vol. 19, pp. 61–67, Jul. 1985.

D. Lischinski et al., Combining Hierarchical Radiosity and Discontinuity Meshing. In *Computer Graphics Proceedings*, Annual Conference Series, pp. 199–208, 1993.

S. Mallat and S. Zhong. Characterization of Signals from Multiscale Edges. *IEEE Trans. On Pattern Analysis and Machine Intelligence*, 14(7):710–732, 1992.

D.P. Mitchell. Generating Antialiased Images at Low Sampling Densities. In M.C. Stone, editor, *Computer Graphics (SIGGRAPH '87 Proceedings)*, vol. 21, pp. 65–72, Jul. 1987.

F. Pighin et al., Progressive Previewing of Ray–Traced Images Using Image–Plane Discontinuity Meshing. *Eurographics Workshop on Rendering* 1997, May 1997.

H. Rushmeier and G. Ward. Energy Preserving Non–Linear Filters. In A. Glassner, editor, *Computer Graphics Proceedings, Annual Conference Series*, pp. 131–138, Jul. 1994.

P. Schroeder and P. Hanrahan. On the Form Factor Between Two Polygons. Technical Resport CS–404–93, Princeton University, Computer Science Department, 1993.

A.J. Stewart and S. Ghali. Fast Computation of Shadow Boundaries Using Spatial Coherence and Backprojections. In A. Glassner, editor, *Computer Graphics Proceedings, Annual Conference Series*, pp. 231–238, Jul. 1994.

I. Sutherland et al., A Characterization of Ten Hidden Surface Algorithms. ACM Computing Surveys, 6(1): 387–441, Mar. 1974.

S. Teller, Computing and Antipenumbra of an Area Light Source. In *Computer Graphics (SIGGRAPH '92 Proceedings)*, vol. 26, pp. 139–148, Jul. 1992.

S. Teller et al., Conservative Radiance Interpolants for Ray Tracing. *Eurographics Workshop on Rendering* 1996, May 1996.

C. Vedel. Computing Illumination from Area Light Sources by Approximate Contour Integration. In *Proceedings of Graphics Interface '93*, Toronto, Canada, May 1993.

G.J. et al., A Ray Tracing Solution for Diffuse Interreflection. In *Computer Graphics (SIGGRAPH '88 Proceedings)*, pp. 85–92, Aug. 1988.

T. Whitted. An Improved Illumination Model for Shaded Display. In *Computer Graphics (SIGGRAPH '79 Proceedings)*, vol. 13, pp. 1–14, Aug. 1979.

G. Wyvill, C. Jay, D. McRobbie, and C. McNaughton. Pixel Independent Ray Tracing. In *Computer Graphics: Developments in Virtual Environments (Proc. CG International '95)*, pp. 43–55, Springer–Verlag, 1995.

G. Wyvill and P. Sharp. Fast Antialiasing of Ray Traced Images. In New Advances in *Computer Graphics (Proc. CG International '95)*, pp. 579–588, Springer–Verlag, 1989.

Outlook on Computer Graphics, by D.P. Greenberg, IEEE Computer, 31(1): 36–36, Jan. 1998.

Antialiased Ray Tracing by Adaptive Progressive Refinement, by J. Painter and K. Sloan, Computer Graphics (SIGGRAPH '89 Proceedings), vol. 23, pp. 281–288, Jul. 1989.

L.D. Bergman. H. Fuchs. E. Grant, and S. Spach. Image Rendering By Adaptive Refinement. In D.C. Evans and R.J. Athay, editors, *Computer Graphics (SIGGRAPH '86 Proceedings)*, vol. 20, pp. 29–37, Aug. 1986.

J. Bloomenthal, Edge Inference with Applications to Antialiasing. In *Computer Graphics (SIGGRAPH '83 Proceedings)*, vol. 17, pp. 157–162, Jul. 1983.

M.R. Bolin and G.W. Meyer. A Frequency Based Ray Tracer. In R. Cook, editor, *Computer Graphics Proceedings, Annual Conference Series*, pp. 409–418, Aug. 1995.

A.T. Campbell III and D.S. Fussell. Adaptive Mesh Generation for Global Diffuse Illumination. In *Computer Graphics (SIGGRAPH '90 Proceedings)*, vol. 24, pp. 155–164, Aug. 1990.

S.E. Chen, H.E. Rushmeier, G. Miller, and D. Turner. A Progressive Multi–Pass Method for Global Illumination. In T.W. Sederberg, editor. *Computer Graphics (SIGGRAPH '91 Proceedings)*, vol. 25, pp. 165–174, Jul. 1991.

N. Chin and S. Feiner. Near Real–Time Shadow Generation Using BSP Trees. In J. Lane, editor, *Computer Graphics (SIGGRAPH '89 Proceedings)*, vol. 23, pp. 99–106, Jul. 1989.

M.F. Cohen, S.E. Chen, J.R. Wallace, and D.P. Greenberg. A Progressive Refinement Approach to Fast Radiosity Image Generation. In J. Dill, editor, *Computer Graphics (SIGGRAPH '88 Proceedings)*, vol. 22, pp. 75–84, Aug. 1988.

R.L. Cook, T. Porter, and L. Carpenter, Distributed Ray Tracing. In *Computer Graphics (SIGGRAPH '84 Proceedings)*, vol. 18, pp. 137–145, Jul. 1984.

F. Crow. Shadow Algorithms for Computer Graphics. In *Computer Graphics (SIGGRAPH '77 Proceedings)*, vol. 11, pp. 242–248, Jul. 1977.

A. Fujimoto, T. Tanaka, and K. Iwata. ARTS: Accelerated Ray Tracing System. *IEEE Computer Graphics and Applications*, 6(4):16–26, Jul. 1986.

P. Heckbert. Discontinuity Meshing For Radiosity. *Third Eurographics Workshop on Rendering*, pp. 203–226, May 1992.

A. Jain. *Fundamentals of Digital Image Processing*. Prentice Ha.., 1989.

M. Kunt, A. Ikonomopous, and M. Kocher. Second–Generation Image Coding Techniques. *Proc. of IEEE*, 73(4):549–574, 1985.

M.E. Lee, R.A. Redner, and S.P. Uselton. Statistically Optimized Sampling for Distributed Ray Tracing. In B.A. Barsky, editor *Computer Graphics (SIGGRAPH '85 Proceedings)*, vol. 19, pp. 61–67, Jul. 1985.

D. Lischinski, F. Tampieri, and D.P. Greenburg. Combining Hierarchical Radiosity and Discontinuity Meshing. In *Computer Graphics Proceedings, Annual Conference Series*, pp. 199–208, 1993.

F. Pighin, D. Lischinski, and D. Salesin. Progressive Previewing of Ray–Traced Images Using Image–Plane Discontinuity Meshing. *Eurographics Workshop on Rendering 1997*, May 1997.

P. Schroeder and P. Hanrahan. On the Forum Factor Between Two Polygons. Technical Report CS–404–93, Princeton University, Computer Science Department, 1993.

I. Sutherland, R. Sproull, and R. Schumacker. A Characterization of Ten Hidden–Surface Algorithms. *ACM Computing Surveys*, 6(1): 387–441, Mar. 1974.

S. Teller. Computing and Antipenumbra of an Area Light Source. In *Computer Graphics (SIGGRAPH '92 Proceedings)*, vol. 26, pp. 139–148, Jul. 1992.

S. Teller, K. Bala, and J. Dorsey. Conservative Radiance Interpolants for Ray Tracing. *Eurographics Workshop on Rendering 1996*, May 1996.

C. Kolb. Rayshade User's Guide and Reference Manual. *Rayshade home page at graphics.stanford.edu*, Jan. 1992.

*Outlook On Computer Graphics*, by D.P. Greenberg, IEEE Computer, 31(1):36–36 (Jan. 1998).

Antialiased Ray Tracing by Adaptive Progressive Refinement, by J. Painter and K. Sloan, *Computer Graphics (SIGGRAPH '89 Proceedings)*, vol. 23, pp. 281–288, Jul. 1989.

G.J. Ward, F.M. Rubinstein, and R.D. Clear. A Ray Tracing Solution for Diffuse Interreflection. In *Computer Graphics (SIGGRAPH '88 Proceedings)*, pp. 85–92, Aug. 1988.

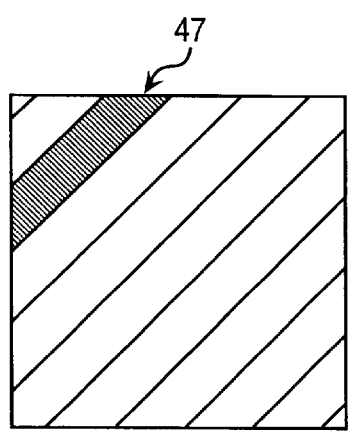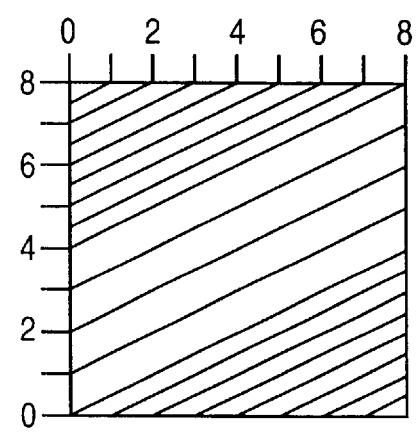
FIG. 4C  FIG. 5

RENDERING OF PHOTOREALISTIC COMPUTER GRAPHICS IMAGES

CROSS REFERENCE TO RELATED APPLICATIONS

This application is a continuation application of a prior application Ser. No. 09/303,966, filed on May 03, 1999.

FIELD OF THE INVENTION

The present invention relates generally to the field of computer imaging and more particularly, to rendering of photorealistic computer graphic images.

BACKGROUND OF THE INVENTION

The ability to synthesize photorealistic images in real-time has been the goal of practitioners in the field of computer graphics for many years. A variety of different techniques are known for generating images of three-dimensional objects on a computer graphics display. One class of techniques divide a two-dimensional array of data values into shaded polygons, which are then projected onto the display screen. To accelerate the image generation process, many polygon-based techniques utilize a special graphics processor to alleviate the computational burden on the computer's central processing unit (CPU).

Another class of computer imaging techniques is known as ray tracing. Ray tracing is a pixel-based technique that is capable of producing highly realistic images in computer graphic systems. A chief drawback of ray tracing techniques, however, is the extensive computations required to generate each pixel of the display screen. These intensive computations often impose a severe burden on the computer processing hardware. The slow processing times associated with ray tracing techniques have limited their application in computer graphics systems. For example, an article entitled, "Outlook on Computer Graphics", by D. P. Greenburg, IEEE Computer, 31(1): 36–36 (January 1998), suggests that it will not be until the year 2025 before computer systems have the display and computational capability to produce realistic, real-time images using pixel-based techniques.

An example of a computer system that utilizes ray tracing is described in "Antialiased Ray tracing by Adaptive Progressive Refinement," by J. Painter and K. Sloan, Computer Graphics (SIGGRAPH '89 Proceedings), Vol. 23, pages 281–288 (July 1989). Further background in this area may be found in U.S. Pat. No. 5,872,902, which teaches a hardware implementation of a computationally intensive anti-aliasing technique for generating three-dimensional images on a workstation graphics processor. U.S. Pat. No. 5,831,623 discloses a volume rendering apparatus for visualizing an image on a display screen of an imaging device such as a computer tomagraphy scanner for a magnetic resonance imaging machine. A method and system for generating an anti-aliasing image of a three-dimensional surface is also described in U.S. Pat. No. 5,542,032, which teaches performing certain floating-point arithmetic and comparison operations on pixel data.

Despite the rapidly increasing power of computers, global illumination is far from being a real-time process. Accurate radiance evaluations often require hours of computation for complex scenes. To balance rendering speed and visual realism, global illumination algorithms have often adopted a progressive refinement approach, like that described in the Painter and Sloan article mentioned above. Progressive refinement methods typically sample densely where sharp features are identified. In areas of the image plane where there is an absence of sharp features—i.e., the image data changes slowly—progressive refinement techniques sample very sparsely, and then interpolate.

The problem with these past techniques is that image artifacts are often lost when the sampling criteria is minimized. For instance, if it is desired to keep the sampling rate below 10%, many prior art progressive refinement approaches prove to be inadequate. In other words, although such techniques provide a reasonable approach to the problem, they require relatively high sampling rates to provide fast rendering of photorealistic computer graphics images. At low sampling rates (e.g., less than 10%) previous techniques such as adaptive stochastic sampling suffer from artifacts including heavily jagged edges, missing object parts, and missing high-frequency details.

BRIEF DESCRIPTION OF THE DRAWINGS

The present invention is illustrated by way of example, and not limitation, in the figures of the accompanying drawings, where:

FIGS. 4A–4C conceptually illustrate various aspects of the construction of the finite element approximate, according to one embodiment.

FIG. 5 conceptually illustrates an example of an oriented finite element for a certain discontinuity orientation within a pixel block, according to one embodiment.

DETAILED DESCRIPTION

Figure 1:
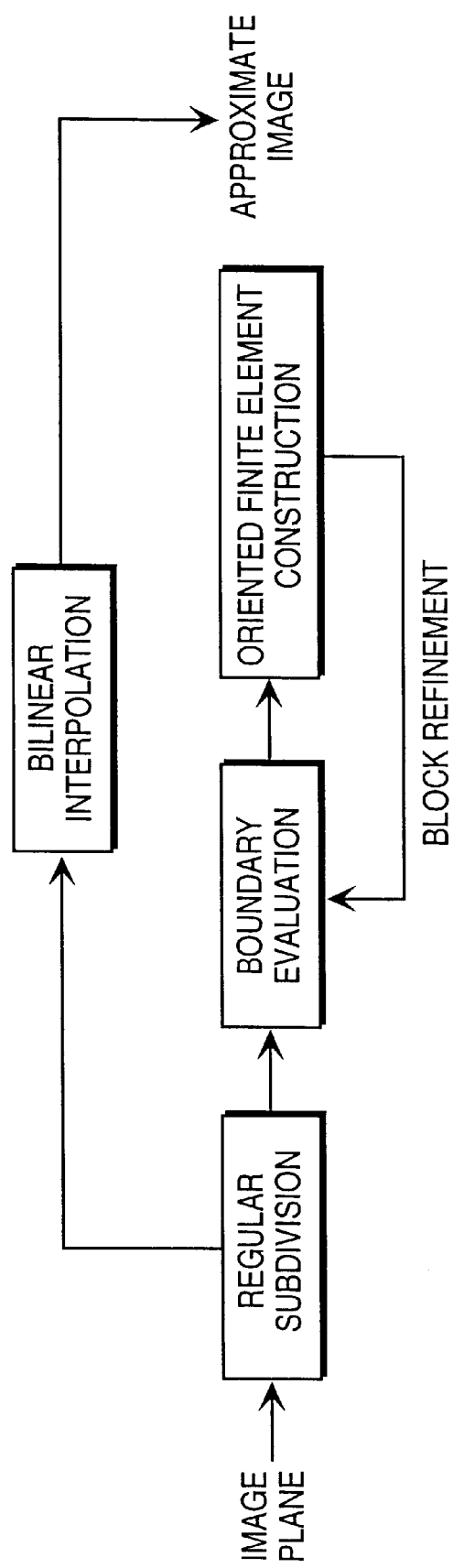
FIG. 1 conceptually illustrates the rendering pipeline, according to one embodiment.

Throughout the following description, numerous specific details are set forth in order to provide a thorough understanding of the embodiments of the present invention. However, it should be understood that the embodiment of the present invention could be practiced without these particulars. In other instances, well known elements have not been shown or described in detail to avoid unnecessarily obscuring the embodiments of the present invention.

A new technology for fast rendering of photorealistic computer graphics images is presented. In the context of the present application this new technology is referred to as a directional coherence map (DCM). DCM is a pixel-based, rather than a polygon-based, technology capable of accurately reproducing subtle shading, shadow, and inter-reflection effects that are commonly seen in real-world scenes. As will become apparent to those of ordinary skill in the art, the DCM accelerator significantly speeds up rendering of ray-traced displays as compared to conventional techniques. In addition, DCM technology may be implemented in a variety of personal computer graphics hardware.

Overview of the DCM Accelerator

The DCM technique for handling general radiance discontinuities in a progressive ray tracing framework includes two primary components: first, an adaptive partitioning of the image plane into blocks, such that each block includes at most one discontinuity edge. Secondly, an estimation of the orientation of the discontinuity edge in each block. The estimation is achieved by computing the "direction of least discrepancy" within the block. The DCM assists in capturing radiance discontinuities by way of finite element approximation to the radiance function, with the finite elements on each block being oriented in accordance with the orientation of the discontinuity within that particular block.

According to one embodiment, instead of evaluating all screen pixels—as is done in conventional ray tracing—the DCM accelerator evaluates through ray tracing only the pixels on the boundary of a block. The boundary or edge pixels typically comprise a small fraction of all of the pixels in a display. As discussed previously, one of the main drawbacks of traditional ray tracing techniques is that they are very computationally intensive; this generally prohibits their use in ordinary computer graphics systems. However, by evaluating only the pixels on the boundary of each block, the DCM approach is able to combine generation of a very high quality image with a small sampling size. By way of example, the DCM technique is capable of rendering photorealistic computer graphics images by sampling as few as 6% of the pixels that make up the image plane.

Following evaluation of the edge or boundary pixels, the remaining pixels are interpolated from the evaluated pixels through an edge-preserving finite element approximation within each image block. The finite element approximant in each block is oriented according to the estimated orientation of the discontinuity within the block. Despite the fact that only a small percentage of all the pixels are evaluated through ray tracing, the quality of the resulting image is very high because by preserving discontinuities, the DCM preserves the high frequency details of the rendered image.

FIG. 1 conceptually illustrates one embodiment of the rendering pipeline, according to one embodiment. As can be seen, the system of FIG. 1 has two main stages. The first is the regular subdivision stage in which the image plane is partitioned into blocks. To perform the regular subdivision, the entire image plane maybe recursively subdivided it into blocks (e.g., by four). Note that during regular subdivision, the four corner pixels of each block may be sampled, and an approximate image may be created for display at any time by interpolating the corner values.

According to one embodiment, the second stage comprises an iterative process in which the DCM is constructed and refined. A subset of blocks are selected as edge blocks, and then analyzed for discontinuities. Blocks not selected simply go to another step of regular subdivision. For each edge block, the block boundary pixels are densely sampled, and the block may be subdivided (e.g., into four quads) for the next iteration. From the evaluated boundary pixels the discontinuities on the edge may be inferred. This information is recorded into the DCM, where it can be later used to construct an oriented finite element approximation of the block. It should be understood that the oriented finite elements on edge blocks, and the bilinear interpolants on any other block, may be resampled at any time at user request.

Pixel Evaluation and Discontinuity Estimation

Figure 2A:
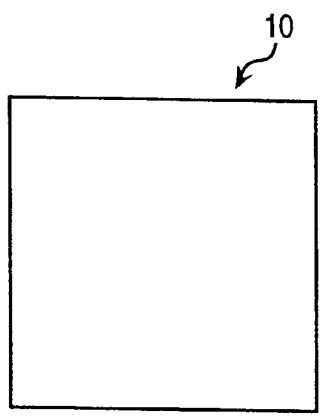
FIGS. 2A–2D conceptually illustrate examples illustrating the pixel on process as controlled by the DCM accelerator, according to one embodiment.

FIGS. 2A–2D conceptually illustrate the pixel evaluation process controlled by the DCM accelerator. FIG. 2A simply shows the image plane 10, which consists of the data to be operated upon by the computer graphics hardware. Taking a divide-and-conquer approach, the DCM treats discontinuities by partitioning the image plane into small blocks so that most blocks are crossed by more than one discontinuity edge.

Figure 2B:
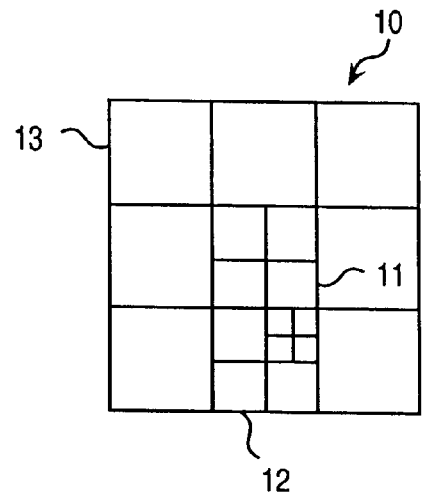

FIG. 2B shows the image plane 10 following adaptive block partitioning. Note that for this example the image plane is first partitioned into a 3×3 array of square blocks, which includes individual blocks 11, 12 and 13. Blocks 11 and 12 are shown being further subdivided into four smaller quadrants. In addition, the upper, right quadrant of block 12 has been further subdivided into four smaller blocks.

The partitioning example of FIG. 2B produces square blocks. However, it should be apparent to those of ordinary skill that other types of blocks may also be generated during partitioning. Furthermore, the extent of the partitioning is dependent upon the computational power that is available. For example, a moving image may not require a great deal of detail to be discerned, so larger block sizes may be selected. Conversely, if the image to be viewed on the display is a static image, smaller block sizes may be selected to resolve more details of the image; thus leading to further subdivision and partitioning of the image plane.

In one embodiment, an elementary block size is 8×8 pixels, but this number could be smaller (e.g., 4×4) or larger in accordance with the above discussion.

Figure 2C:
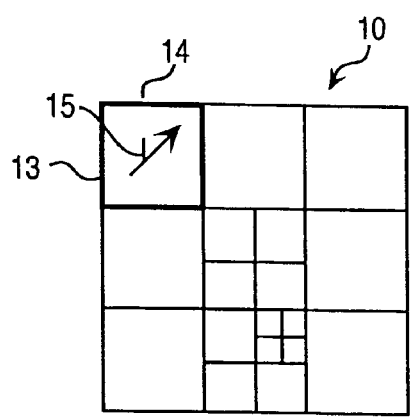

FIG. 2C conceptually illustrates boundary evaluation of a single block 13 of image plane 10. The thick, heavy boundary line 14 of block 13 in FIG. 2C represents the edge pixels on the block boundary. According to one embodiment, it is only these edge pixels that are evaluated as a basis for providing a best estimation of the sharp edge direction for the block. The sharp edge direction is referred to as the direction of least discrepancy and is illustrated in FIG. 2C by arrow 15. Another way to conceptualize the direction of least discrepancy is that it refers to the direction in which the image is changing slowest within the block.

Figure 3A:
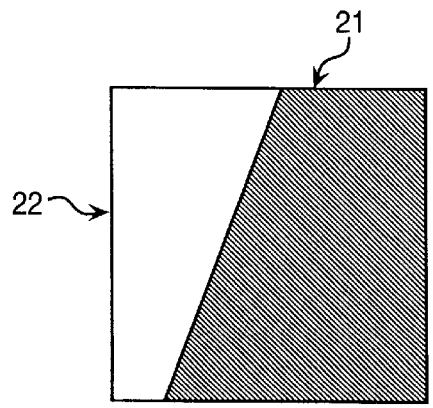
FIGS. 3A–3B conceptually illustrate examples of different discontinuties present within the image data of a block, according to one embodiment.
Figure 3B:
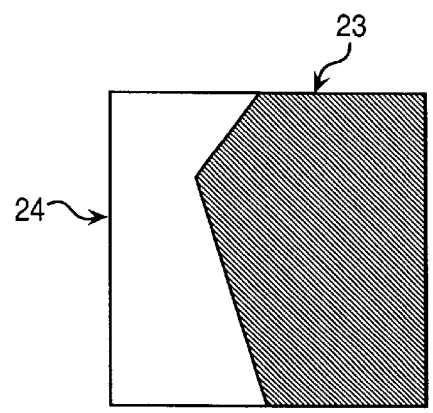

At this point, it may be helpful to refer to FIGS. 3A and 3B, which conceptually illustrate examples of different discontinuities present within the image data of a block, according to one embodiment. Note that each of the blocks of FIGS. 3A and 3B include a shaded portion and an unshaded portion. For example, in FIG. 3A, region 22 is unshaded and region 21 is shaded. Similarly, in FIG. 3B, region 23 is shaded and region 24 is unshaded.

With reference once again to FIG. 2C, the orientation of the discontinuity in block 13 is computed from the boundary pixels 14 as the direction of least discrepancy 15. It should be understood that this orientation is only an estimate, since the direction of the actual discontinuity could lie anywhere from 0° to 180° (actually 0°–360° considering opposite directions). According to one embodiment, the number of possible edge directions is discretized, e.g., into eight different directions. For each of the different directions a discrepancy number is computed from the evaluated boundary pixels. In one implementation, the discrepancy number corresponds to the sum of the differences of the pixels on opposing sides of the boundary along a particular direction. In other words, all of the differences along a particular direction are first computed by subtracting pixel values located on opposite sides of the boundary. Next, all of the differences are summed, with the result being the discrepancy number associated with that particular direction. For each of the discrete number of directions, the one direction having the smallest discrepancy is chosen as the direction of least discrepancy.

Figure 2D:
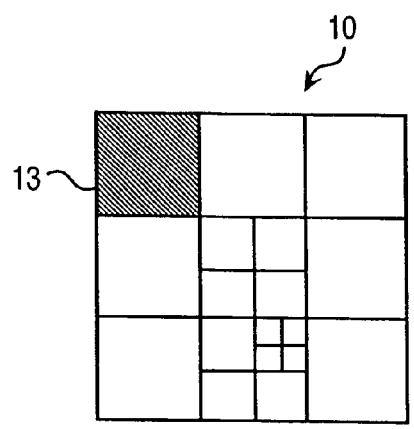

After one of the directions has been selected as the direction of least discrepancy (i.e., the edge direction) a straightforward bilinear interpolation is performed oriented along the selected direction. For example, FIG. 2D shows interpolation of the remaining interior pixels of block 13 through oriented finite element construction. Performing a bilinear interpolation along the discontinuity edges of the image leads to smooth edges in the final reproduced image. Smooth edges, obviously, are an important characteristic of a high quality picture. The resulting approximate image is produced when all of the blocks have been processed as described above.

Mathematical Description

Figure 4A:
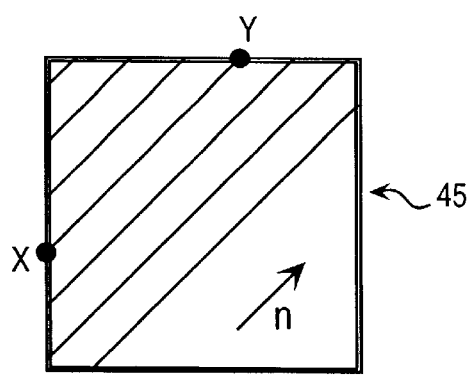

For an image function $f(x)$, the direction of the least discrepancy $m_k$ (of a k×k block $B_k$) is defined to be the unit factor that minimizes the contour integral, $$d(n) = \frac{1}{s} \int_C (f(x + t_x n) - f(x))^2 ds$$

where C is the boundary contour of $B_k$ and s is the length of the contour. Practitioners in the art will appreciate that the integration actually only needs to extend over half the contour. For a fixed direction n and a point x on C, the scalar $t_x$ is chosen such that the parametric line y(t)=x+tn intersects the contour C at x and y=x+$t_x$n, as is shown in FIG. 4A. Note that in FIG. 4A the boundary or edge pixels are represented by heavy dark line 45.

For computer implementation, n=[cos Θ, sin Θ] and the angular range 0≦Θ<π is discretized into h directions $Θ_i$=i π/h; 0≦i<h−1. For each direction $n_i$=[cos $Θ_i$, sin $Θ_i$], the directional discrepancy $d(n_i)$ is computed as:

$$d_i = d(n_i) = \frac{1}{4(k-1)} \sum_{p \in P} (f(p + t_p n_i) - f(p))^2$$

where P is the set of all pixels in C and $t_p$ is chosen such that the line y(t)=p+t$n_i$ intersects the contour C at p and p+$t_p n_i$. Next, the sequence $\{d_0, \ldots, d_{h-1}\}$ is evaluated and the minimum $d_j$=min$\{d_0 \ldots, d_{h-1}\}$ is computed to determine with direction of least discrepancy; $m(B_k)=n_j$.

The image function in block $B_k$ may be approximated by a finite element function oriented along the direction of least discrepancy. The finite element approximation is a continuous function consisting of bilinear elements (i.e., quadratic polynomials).

Oriented Finite Elements

Figure 4B:
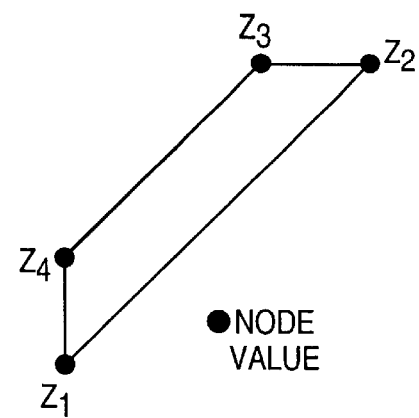

FIGS. 4B and 4C conceptually illustrate the construction of the finite element, according to one embodiment. At this point, the direction of least discrepancy has been found from the evaluated pixels on the boundary contour C (FIG. 4A). In FIG. 4B, there is shown the construction of a typical bilinear element on a quadrilateral Q=[$Z_1 Z_2 Z_3 Z_4$] with known node values $f_n$ ($z_i$), i=1:4. Essentially, this construction is a Gouraud interpolation with the scan line rotated to be parallel with the least discrepancy direction. Note that FIG. 4B is a zoomed version of the shaded element 47 in FIG. 4C. Each of these illustrations is provided to show a typical bilinear element. By way of further example, FIG. 5 provides an example of an oriented finite element for a different discontinuity orientation for an 8×8 pixel block.

It will be appreciated that the above description of least discrepancy direction in oriented finite elements may be easily extended to convex image blocks, including the non-square blocks, which are often encountered in a quadtree subdivision of the image plane. Practitioners will further appreciate that the least discrepancy direction approach provides beneficial results because of image-space coherence. Coherence is typically referred to as the degree to which parts of the scene or its projection exhibit local similarities. A discontinuity edge represents a break of coherence, since image data changes abruptly across the edge. However, discontinuities do not break all forms of coherence. Specifically, image data is typically coherent along the direction of the discontinuity edge even if they change abruptly across the edge. For a block with a simple discontinuity edge, the least discrepancy direction represents the direction of maximal coherence as can be inferred from the evaluated boundary pixels. By orienting the finite elements among this direction, the present invention maximizes the likelihood of capturing the discontinuity edge along with its characteristics.

The DCM method, according to one embodiment, provides great advantages over prior art techniques because it allows the generation of high quality images from a small percentage of evaluated pixels. By capturing and preserving discontinuities, the DCM accelerator also overcomes the fundamental obstacle faced by previous adaptive sampling approaches. For a global illumination rendering a scene consisting of smooth surfaces, the DCM accelerator of the present invention is capable of producing high quality images very efficiently. A typical implementation of the present invention can produce a photorealistic computer image by evaluating less than 6% of the pixels. At such a low sampling rate, conventional adaptive sampling approaches suffer from numerous problems described previously. A personal computer with a DCM accelerator, according to one embodiment, uses 16 times less CPU power than one without the DCM accelerator. Thus, personal computer hardware manufacturers can implement, according to one embodiment, in 3-D graphics rendering pipelines to enable photorealistic rendering at interactive rates.

It should be understood that although the embodiments of the present invention have been described in conjunction with certain specific embodiments, numerous modifications and alterations could be made without departing from the scope of the present invention. Accordingly, the specification and drawings are to be regarded in an illustrative, rather than a restrictive sense.

What is claimed is:

1. An apparatus, comprising:
   a processor;
   a directional coherence map (DCM) accelerator coupled with the processor, the DCM accelerator to:
   partition an image into a plurality of regions, wherein each of the plurality of regions having a discontinuity edge, a boundary, edge pixels along the boundary, and remaining pixels; and
   estimate orientation of the discontinuity edge by computing direction of least discrepancy within each of the plurality of regions by evaluating the edge pixels along the boundary of each of the plurality of regions.

2. The apparatus of claim 1, wherein the DCM accelerator is further to reproduce the image.

3. The apparatus of claim 1, wherein the DCM accelerator is further to interactively bilinearly interpolate the remaining pixels of each of the plurality of regions, wherein the interactive bilinear interpolation comprises interpolation orientation along the direction of least discrepancy.

4. The apparatus of claim 1, the DCM accelerator is further to construct a finite element approximation for each of the plurality of regions in accordance with the estimated orientation of the discontinuity edge.

5. The apparatus of claim 1, wherein the plurality of regions comprises a plurality of blocks, each of the plurality of blocks having a plurality of squares of varying sizes.

6. The apparatus of claim 1, wherein the DCM accelerator is further to partition each of the plurality of regions into a plurality of smaller regions.

7. The apparatus of claim 1, wherein the DCM accelerator is further to interactively select each of the plurality of regions.

8. The apparatus of claim 1, wherein estimate orientation comprises interactively estimate orientation.

9. The apparatus of 2, wherein reproduce the image comprises interactively reproduce the image.

10. The apparatus of claim 1, wherein the DCM accelerator comprises a pixel-based DCM accelerator to reproduce one or more of the following: subtle shading, shadow, and inter-reflection effects.

11. The apparatus of claim 2, wherein the reproduce the image comprises speedily reproduce the image.

12. A system, comprising:
   a storage device;
   a processor coupled with the storage device; and
   a directional coherence map (DCM) accelerator coupled with the processor, the DCM accelerator to:
   partition an image into a plurality of regions, wherein each of the plurality of regions having a discontinuity edge, a boundary, edge pixels along the boundary, and remaining pixels; and
   estimate orientation of the discontinuity edge by computing direction of least discrepancy within each of the plurality of regions by evaluating the edge pixels along the boundary of each of the plurality of regions.

13. The system of claim 12, wherein the DCM accelerator is further to reproduce the image.

14. The system of claim 12, wherein the DCM accelerator is further to interactively bilinearly interpolate the remaining pixels of each of the plurality of regions, wherein the interactive bilinear interpolation comprises interpolation orientation along the direction of least discrepancy.

15. A method, comprising:
   partitioning an image into a plurality of regions, each of the plurality of regions having a discontinuity edge, a boundary, edge pixels along the boundary, and remaining pixels; and
   estimating orientation of the discontinuity edge by computing a direction of least discrepancy within each of the plurality of regions by evaluating the edge pixels along the boundary of each of the plurality of regions.

16. The method of claim 15, further comprises reproducing the image.

17. The method of claim 15, further comprises interactive bilinear interpolation of the remaining pixels of each of the plurality of regions, wherein the interactive bilinear interpolation is oriented along the direction of least discrepancy.

18. The method of claim 15, wherein the plurality of regions comprises a plurality of blocks, each block of the plurality of blocks having a plurality of squares of varying sizes.

19. The method of claim 15, further comprises edge-preserving finite element approximation within each of the plurality of regions, wherein the edge-preserving finite element approximation is in accordance with the estimated orientation of the discontinuity edge.

20. The method of claim 15, further comprises recording the estimated orientation of the discontinuity edge.

21. The method of claim 20, further comprises using the recorded estimated orientation of the discontinuity edge to construct an approximate image.

* * * * *

UNITED STATES PATENT AND TRADEMARK OFFICE
CERTIFICATE OF CORRECTION

PATENT NO. : 6,782,130 B2
DATED : August 24, 2004
INVENTOR(S) : Guo

It is certified that error appears in the above-identified patent and that said Letters Patent is hereby corrected as shown below:

Column 2,
Line 26, delete "on" and insert -- evaluation --.

Signed and Sealed this

Twenty-first Day of June, 2005

JON W. DUDAS
*Director of the United States Patent and Trademark Office*